United States Patent
Singer et al.

(10) Patent No.: US 7,791,758 B2
(45) Date of Patent: Sep. 7, 2010

(54) VIBRATION CONTROL TECHNOLOGY AND INTERFACE FOR COMPUTER PRINTERS AND SCANNERS

(75) Inventors: Neil C. Singer, Armonk, NY (US); Kenneth Pasch, North Eastham, MA (US); Mark Tanquary, Needham, MA (US)

(73) Assignee: Convolve, Inc., New York, NY (US)

( * ) Notice: Subject to any disclaimer, the term of this patent is extended or adjusted under 35 U.S.C. 154(b) by 976 days.

(21) Appl. No.: 09/847,253

(22) Filed: May 2, 2001

(65) Prior Publication Data

US 2002/0015163 A1 Feb. 7, 2002

Related U.S. Application Data

(60) Provisional application No. 60/201,184, filed on May 2, 2000.

(51) Int. Cl.
 *G06K 15/10* (2006.01)
 *G06F 15/02* (2006.01)
 *H04N 1/60* (2006.01)
(52) U.S. Cl. .................... 358/1.5; 358/1.2; 358/1.9

(58) Field of Classification Search ............... 358/1.15, 358/1.1, 1.9, 1.11–1.18, 1.2, 1.5; 318/560, 318/567, 569, 600, 78.06
See application file for complete search history.

(56) References Cited

U.S. PATENT DOCUMENTS

| | | | | |
|---|---|---|---|---|
| 5,914,736 A | * | 6/1999 | Tamura | 347/37 |
| 6,011,373 A | * | 1/2000 | McConnell et al. | 318/560 |
| 6,055,391 A | * | 4/2000 | Jackson et al. | 399/91 |
| 6,203,139 B1 | * | 3/2001 | Beauchamp | 347/37 |
| 6,694,196 B2 | * | 2/2004 | Tuttle et al. | 700/28 |

FOREIGN PATENT DOCUMENTS

WO    WO 9945535 A1  *  9/1999

* cited by examiner

*Primary Examiner*—Thierry L Pham
(74) *Attorney, Agent, or Firm*—Oblon, Spivak, McClelland, Maier & Neustadt, L.L.P.

(57) ABSTRACT

Method and apparatus for altering the operation of printers and scanners to reduce vibration and/or acoustics. The technology involves altering the mode of operation of the printer or scanner to be in either "quick", "quiet" or an intermediate mode. Additionally, structure for achieving the different modes of operation are also disclosed.

20 Claims, 2 Drawing Sheets

VIBRATION CONTROL TECHNOLOGY AND INTERFACE FOR COMPUTER PRINTERS AND SCANNERS

This application claims priority to provisional patent application Ser. No. 60/201,184 filed May 2, 2000 for Vibration Control Technology and Interface for Computer Printers and Scanners.

BACKGROUND OF THE INVENTION

This invention relates to computer printers and scanners and, more particularly, to vibration suppression in computer printers and scanners.

Vibration suppression technology developed by the inventor herein has been described in his U.S. Pat. Nos. 4,916,635 and 5,638,267 and in pending patent application Ser. No. 09/262,781 filed Mar. 4, 1999. The teachings of these patents and patent application are incorporated herein by reference. The technology disclosed in these references is referred to by the registered trademark Input Shaping®. As disclosed in these references, commands to a physical system are processed based on knowledge of system parameters such as vibrational frequencies, damping ratios, or measured system response, and system limitations. In particular, with knowledge of natural frequency and damping ratio, a desired input command is "shaped" so that the physical system is moved from an initial state to a final state with eliminated or suppressed residual vibration.

The elimination or suppression of residual vibration reduces settle times for machinery and/or reduces excessive acoustic noise that would occur without the use of the anti-vibration technology. The use of knowledge of vibrational frequencies and a damping estimate to generate new commands provides the unusual benefits set forth in the patents and patent application mentioned above. Techniques prior to the teachings in the patents set out above did not use such knowledge or if they did, the techniques were computationally expensive or impractical. As a result, commercial printer products and similar scanning devices do not use knowledge of vibrations or system response, and system limitations as part of their command generation process. Furthermore, the techniques set forth in the patents and patent application mentioned above can "target" specific frequencies thus yielding particularly good trajectories that are fast and vibration reducing. Other approaches tend to smooth trajectories in an effort to reduce vibrations or acoustics and therefore incur large time penalties. The techniques set forth in the patents and patent application mentioned above are therefore not just smooth versions of an unshaped command and are designed to match a particular system.

Computer printers create images by moving a print head (often called an ink pen) across the paper. As demand for high-speed printing increases, the speed of the print head translation increases, the speed of the paper advance increases, and the speed of the print head dot generation (e.g. ink jet frequency) increases. Current printers move fast enough that they start to excite vibrations. First, vibrations within the printer require that the printer pause between each scan across the paper or alternatively require that the width of the printer be increased to accommodate the over travel needed to accelerate and decelerate the print head without vibrations. Second, accelerations induced by the scanning motion of the print head excite vibrations of the entire printer and the table on which it is placed. Third, fluid dynamic vibrations interact with the dot generation process for ink jet printing. Further, fluid dynamic interactions among ink channels interact with the ink jet dot generation process. Fluid dynamic vibration reduction can be used to increase dot generation speed and to improve the quality and repeatability of dot generation and reduce spatter. Lastly, advancement of the paper between scans of the print (or scan) head can excite vibrations of the printer, table, and the paper itself.

With the newest generation of printers, the accelerations are high enough to annoy many computer users. The printer shakes the table so that no other equipment can be used at the same time. For example, if a monitor resides on the same table, it may become difficult to read because the table is shaking. The same holds true for computer scanners. The scanning element is moved across the paper, or a negative or photograph is moved across the element. As the scan speed increases, vibrations and their undesirable effects increase. Thus there is a need for vibration control technology to be applied to the current generation of high speed printers and scanners.

SUMMARY OF THE INVENTION

In one aspect the invention is a computer peripheral comprising at least one element supported for motion and an electromechanical mechanism for moving the moveable element. Circuitry provides a shaped input to the electromechanical mechanism to move the moveable element along a desired trajectory. In preferred embodiments, the desired trajectory results in maximum speed operation or in quiet operation. The desired trajectory may also result in a vibration reduced mode or one that reduces unwanted frequencies. The computer peripheral may be, for example, a printer or a scanner or any other reproduction device that generates or scans an image or object. The peripheral may further include a sensor such as an accelerometer or a microphone used by the circuitry to provide measurements used in generating the shaped input.

In another aspect, the computer peripheral includes at least one element supported for motion and an electromechanical mechanism for moving the moveable element. Circuitry provides a shaped input to the electromechanical mechanism to move the moveable element along a trajectory and a user interface allows a user to select a desired trajectory. The user may thus select a quick, quiet or optionally an in-between trajectory. In a preferred embodiment, the peripheral is a printer and the moveable element is a print head. The moveable element may also be a paper feeding mechanism.

To design a printer according to the invention, the moving portion of the printer (or scanner) (either the print or scanning apparatus or the paper feed mechanism) is driven as fast as possible, thus exciting vibrations in the printer and the table on which it resides. The designer (or built-in sensor(s)) then measures the frequencies and approximate damping of the vibrations. This vibration information is then used to alter the commands to a closed-loop controller that controls the moving part of the printer (or scanner). The input commands are shaped using any vibration suppression technology such as that disclosed in the above-mentioned patents and patent application. When the printer is shipped to the customer, the printer no longer exhibits the unwanted vibrations.

The unwanted vibrations may be either vibrations of the structural components of the printer (or scanner); vibrations of the drive train that moves the print head; vibrations of the suspension holding the printer mechanism in its case; or vibrations of the entire printer on flexible mounts or feet. Any combination of vibrations of any part of the printer structure may be reduced using a technology such as that discussed in the previous section.

An important aspect of the invention is a user interface that enables the consumer to adjust the vibration reduction "in the field" (as opposed to "at design time"). For example, the user might click on a tab in the printer properties dialog box or run a utility program and go to a screen that allows him to select the type of table on which the printer is located. For example, the user might choose between a "rigid", "medium", or "flexible" table.

Another aspect of the user interface is to allow the user to choose between different built-in motion profiles. For example, the printer may have several shaped inputs that offer fast or quieter operation. The user can choose through an interface to select a mode of operation that matches the desired performance to the motion profiles.

Yet another aspect of the invention is printer software that allows the user to try out several different shaping configurations to determine the best vibration reduction to apply to the printer's motion. As an example, the user could start the process, the printer moves back and forth and the software asks the user to indicate if the vibrations are improved. The software offers the user an opportunity to choose the better shaped input between two settings much as an ophthalmologist does during an eye exam with two lenses. The printer could be instrumented with a sensor to measure the resulting vibrations. Alternatively, the control system itself may be used as a vibration sensor.

The suspension of the printer may be designed so that it results in a known vibration frequency. Using this information, a vibration reducing technology can be readily applied and the printer will be able to be operated more quietly, and with reduced transmitted vibrations.

The trajectory of the mechanism used to drive the paper feed portion of the printer may also be altered to reduce vibrations. This trajectory alteration may be to reduce vibrations induced in the printer or table as in the other aspects of the invention. Furthermore, the trajectory of the paper feed system can be modified to reduce the acoustic noise generated within the paper itself. Each time the paper is advanced, the rapid movement of the paper makes noise. Altering the command trajectory of the paper advance mechanism can reduce this noise. The method by which the trajectory is modified may either be established at design time, or the user may control it at installation or print time. For example, the user might specify the type of paper being used, and the printer will shape for the frequencies induced in that paper type.

It is further recognized that the term computer printer or scanner may refer to any computerized reproduction device that generates or scans an image or object. For example, it would apply equally to machinery that "prints" 3 dimensional parts (rapid prototyping machines) or machinery that deposits material in any manufacturing process.

It is further recognized that increasing the "speed" of a machine such as the print head or paper advance mechanism, actually means that any combination of the following is achieved: the velocity is increased, the acceleration is increased, the settle time is decreased, and/or the overall productivity is improved.

DESCRIPTION OF THE PREFERRED EMBODIMENT

Figure 1:
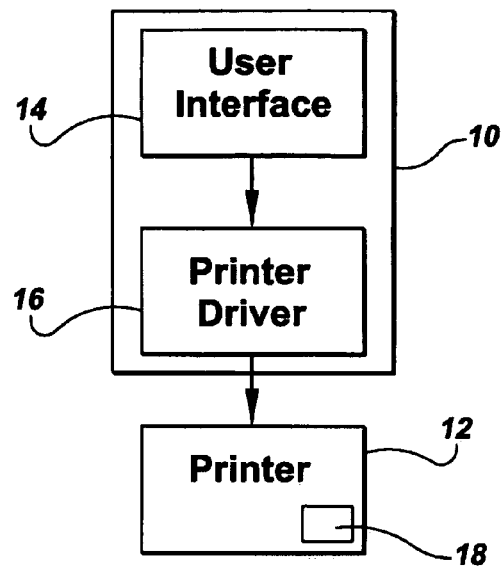
FIG. 1 is a block diagram illustrating a printer embodiment of the invention.

The exemplary description provided below is in terms of a printer. It is fully recognized that the same description would apply to scanners or any other computerized reproduction device that works in a similar fashion. FIG. 1 shows a block diagram of a computer 10 and printer 12. The user specifies information about the mode of operation of the printer 12 (i.e. "Quick" or "Quiet"). The user does this through a command or user interface 14. The interface 14 could be built into a printer driver 16 and appear on a print dialog box. Alternatively, the interface 14 could be a stand-alone configuration program that the user uses to periodically (or even once) change the printer's mode of operation. Alternatively, the interface 14 could be part of the printer 12 installation program.

Figure 2:
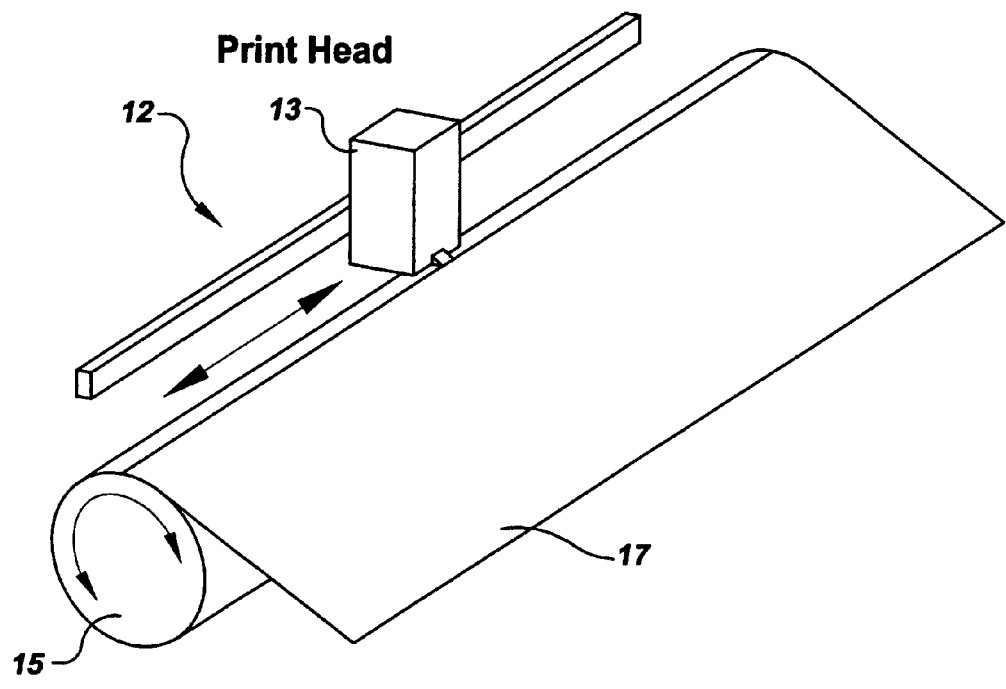
FIG. 2 is a schematic, plan view of a printer and print head.

With reference to FIG. 2, the printer 12 includes a print head 13 that is mounted for lateral translation. The printer 12 also includes a paper feed mechanism 15 that advances paper 17.

Once a user specifies the mode of operation, that information is stored either on the computer 10 or in the printer 12 itself. As the printer 12 prints its pages, it uses trajectories that have the property that was selected in the interface 14. For example, if the user configures the printer to not excite the vibrations in the table on which the printer is placed, the printer will use trajectories that have been shaped in a fashion to reduce those vibrations. Note that several techniques for selectively suppressing frequencies by designing an input are given in U.S. Pat. No. 4,916,635, U.S. Pat. No. 5,638,267, or patent application Ser. No. 09/262,781, all incorporated herein by reference. Alternatively, a shaped trajectory can be generated by altering a single trajectory with one of a collection of tabulated functions (InputShapers™).

In the preferred embodiment, the information about the mode of operation of the printer was transmitted from the computer to the printer. However, while it is recognized that this results in a software command being issued to the printer over its standard connection to the computer, an electromechanical switch or jumper could equally serve as an interface to select the mode of operation of the printer. Therefore, any user input to the printer could change this mode of operation.

In another preferred embodiment, the user is given the opportunity to move the print head in the printer, observe the behavior of the printer on the table, and answer a series of questions to guide the user in selecting the best setting for that particular printer on that particular table.

In another embodiment, the printer incorporates a sensor 18 that provides a measurement of the printer's response to an input so that the printer 12 and computer 10 could further automate the tuning of the system and select the best inputs for the system. The sensor 18 measures some unwanted dynamic response such as vibration, table motion, or acoustic output. As an example of this, an accelerometer or microphone is mounted on the printer. The printer moves, thereby creating a signal from the sensor 18. The sensor data is processed to determine the frequencies that need to be suppressed and the system selects the proper inputs to use for commanding the printer to move. Alternatively, the control system may be used as a vibration sensor by examining unwanted dynamics in the feedback sensors or signals available in the electronics (motor current or voltage as an example).

Any of these techniques can be implemented by applying a vibration suppression technology, such as one of the many Input Shaping® variations to the computer printer 12 or scanner (not shown). The advantage of this invention is the recognition that printers and scanners can be significantly improved by measuring or empirically deducing frequency information and modifying the motion of the moving parts to compensate for those vibrations. It is recognized that Input Shaping® is not the only approach that could be combined with the user interface. In fact, any technique that alters the shape of the input trajectory (in either current, voltage, velocity, position, or any other preferred input to the system) can be used. Furthermore, lowering the amplitude (or scaling) of the input trajectory can achieve the vibration suppression. As an example, if the input is a bang-bang input in current, the maximum current limit can be lowered to achieve a form of vibration reduction. However, while this approach would be functional, move times would be significantly increased and vibration suppression is not as successful. The preferred approach is to alter the trajectory shape in some fashion that achieves the vibration reduction.

Another aspect of the invention is to design the suspension of the printer so that it results in a known vibration frequency. Using this information, a vibration reducing technology can be readily applied and the printer will be able to be operated more quietly, and with reduced transmitted vibrations.

As discussed above, the trajectory used to drive the paper feed portion of the printer can be altered to reduce vibrations. This may be to reduce vibrations induced in the printer or table as in the other aspects of the invention. Furthermore, the trajectory of the paper feed system can be modified to reduce the acoustic noise generated within the paper itself. Each time the paper is advanced, the rapid movement of the paper makes noise. Altering the command trajectory of the paper advance mechanism can reduce this noise. The method by which the trajectory is modified may either be established at design time, or the user may control it at installation or print time. For example, the user might specify the type of paper being used (as many print drivers currently allow), and the printer will shape for the frequencies induced in that paper type. Furthermore, the sensor technique described above may be used to acquire the acoustic signal from the advancing paper. This signal can then be used to measure frequencies with which to alter or design input trajectories to the printer advance mechanism.

Figure 3:
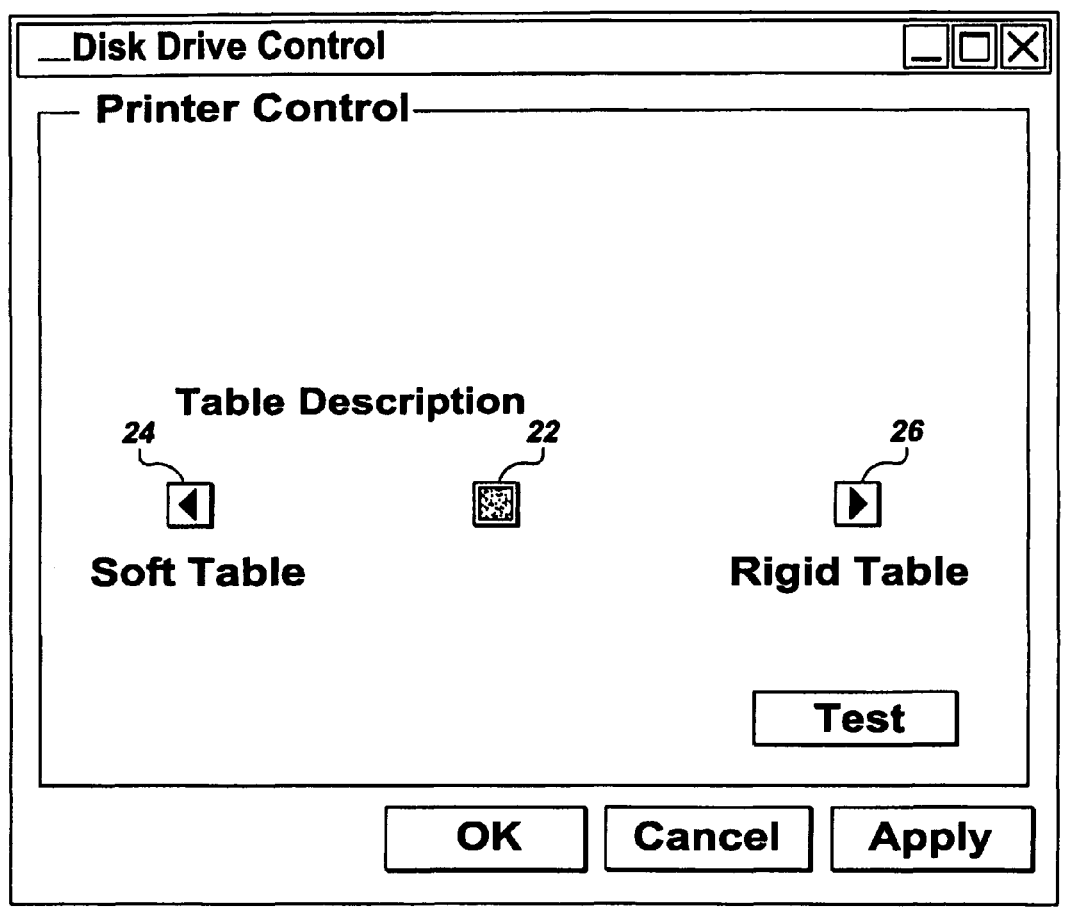
FIG. 3 is a schematic illustration of a user interface for use in the invention.

FIG. 3 illustrates user control, according to the invention, for tuning the printer to its environment. A printer control user interface 20 includes a slider 22 which can be moved between a soft table location 24 and a rigid table 26. As discussed above the user can move the slider 22 depending on the dynamic characteristics of a table on which the printer 12 is supported to reduce overall printer/table vibrations. It is further recognized that any similar interface including a command line input or keystroke could be used to control the printer in a similar manner.

It is recognized that modifications and variations of the invention will be apparent to those skilled in the art and it is intended that all such modifications and variations be included within the scope of the appended claims.

What is claimed is:

1. A computer peripheral, comprising:
   an electromechanical mechanism configured to advance paper during a print operation; and
   an input to an actuator of the electromechanical mechanism constructed based on acoustic frequencies of the paper, the acoustic frequencies of the paper being associated with acoustic noise generated by advancement of the paper by the electromechanical mechanism, to reduce the acoustic noise generated by the advancement of the paper.

2. A computer peripheral, comprising:
   an electromechanical mechanism configured to advance paper during a print operation; and
   an input to a controller of the electromechanical mechanism constructed based on acoustic frequencies of the paper, the acoustic frequencies of the paper being associated with acoustic noise generated by advancement of the paper by the electromechanical mechanism, to reduce the acoustic noise generated by the advancement of the paper.

3. The computer peripheral of claim 1 or claim 2 in which a trajectory associated with the input results in maximum speed of paper advance subject to acoustic noise, structural vibration, and motion constraints.

4. The computer peripheral of claim 1 or claim 2 wherein a trajectory of the electromechanical mechanism associated with the input, results in vibration-reduced operation of paper advance.

5. The computer peripheral of claim 1 or claim 2 further comprising a sensor responsive to the dynamic response of the peripheral.

6. The computer peripheral of claim 5 wherein the sensor is an accelerometer.

7. The computer peripheral of claim 5 wherein the sensor is a microphone.

8. The computer peripheral of claim 5 wherein an output from the sensor is used in the construction of the input.

9. The computer peripheral of claim 1 or claim 2 wherein the peripheral is a printer.

10. The computer peripheral of claim 1 or claim 2 wherein the peripheral is a scanner.

11. The computer peripheral of claim 1 or claim 2 further comprising a user interface.

12. The computer peripheral of claim 1 or claim 2 wherein increasing speed of the advancement of the paper decreases reduction of the acoustic noise.

13. The computer peripheral of claim 11 wherein the peripheral is a printer.

14. The computer peripheral of claim 11 wherein the peripheral is a scanner.

15. The computer peripheral of claim 1 or claim 2, further comprising a user control configured to tune the computer peripheral to its environment.

16. The computer peripheral of claim 1 or claim 2, wherein the acoustic frequencies of the paper are changed based on a characteristic of the paper specified by a user or detected by the computer peripheral.

17. The computer peripheral of claim 15, wherein the peripheral is operated on a table and the user control includes a mechanism to designate a characteristic of the table.

18. The computer peripheral of claim 15, wherein the user control includes a mechanism to specify a characteristic of the paper.

19. The computer peripheral of claim 12, wherein the peripheral includes a user control to select a speed of the advancement of the paper.

20. The computer peripheral of claim 1 or claim 2 further comprising a means for a user to interface with the computer peripheral.

* * * * *